United States Patent
Lee et al.

(10) Patent No.: US 12,542,476 B2
(45) Date of Patent: Feb. 3, 2026

(54) POWER CONVERTER HAVING IMPROVED ZERO CURRENT DETECTING FEATURE

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Ju Won Oh, Suwon-si (KR); Jong Wan Jo, Suwon-si (KR); Sung Jae Lee, Seoul (KR); Seung Gyun Ha, Seoul (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 222 days.

(21) Appl. No.: 18/396,741

(22) Filed: Dec. 27, 2023

(65) Prior Publication Data

US 2025/0211087 A1    Jun. 26, 2025

(30) Foreign Application Priority Data

Dec. 21, 2023 (KR) ......................... 10-2023-0188200

(51) Int. Cl.
| | |
|---|---|
| H02M 1/00 | (2007.01) |
| G05F 1/565 | (2006.01) |
| H02M 3/155 | (2006.01) |
| H02M 3/156 | (2006.01) |
| H02M 3/158 | (2006.01) |

(52) U.S. Cl.
CPC ....... *H02M 1/0048* (2021.05); *H02M 1/0009* (2021.05); *H02M 1/0093* (2021.05); *H02M 3/155* (2013.01); *G05F 1/565* (2013.01); *H02M 3/156* (2013.01); *H02M 3/158* (2013.01)

(58) Field of Classification Search
CPC ....... H02M 1/0009; H02M 3/155–156; H02M 3/158; G05F 1/565
See application file for complete search history.

(56) References Cited

U.S. PATENT DOCUMENTS

| | | | |
|---|---|---|---|
| 2007/0085523 A1* | 4/2007 | Scoones | H02M 3/158 323/314 |
| 2020/0119641 A1* | 4/2020 | Liang | H02M 3/157 |

FOREIGN PATENT DOCUMENTS

| | | |
|---|---|---|
| CN | 115528890 A | 12/2022 |
| EP | 2869447 A1 | 5/2015 |

OTHER PUBLICATIONS

European Office Action dated Jul. 3, 2024 from European Patent Office for Application No. 23220017.0.
(Continued)

*Primary Examiner* — Gary A Nash

(57) ABSTRACT

Technology regarded to an electric circuit, particularly a zero current detection circuit, is disclosed. The proposed zero current detection circuit has a calibration circuit that calibrates an offset error thereof. The offset calibration circuit detects a delay between an output time point of the zero current detection circuit and a moment of change in voltage of the common node and outputs a calibration signal accordingly. The zero current detection circuit includes a pre-amplifier that calibrates a differential voltage according to an offset control signal and a phase comparator that detects a zero current point from the differential voltage.

16 Claims, 13 Drawing Sheets

(56) References Cited

OTHER PUBLICATIONS

European Search Report dated Jun. 7, 2024 from European Patent Office for Application No. 23220017.0.
Zhouchao Sun et al., 'Adaptive Gate Switching Control for Discontinuous Conduction Mode DC-DC Converter', IEEE Transactions on Power Electronics, Mar. 1, 2014, pp. 1311-1320, vol. 29, No. 3, Institute of Electrical and Electronics Engineers, USA.

* cited by examiner

POWER CONVERTER HAVING IMPROVED ZERO CURRENT DETECTING FEATURE

BACKGROUND OF THE INVENTION

Field of the Invention

Disclosed is technology related to a zero current detection circuit that optimizes charge/discharge control of an energy storage element in a power converter, especially a direct current (DC)-to-DC converter.

Description of the Related Art

A DC-to-DC converter controls charging and discharging of an energy storage element, such as an inductor, using a switching element. In this instance, when the switching timing is inaccurate, energy charging the inductor is insufficiently transferred to a load, or current flows backwards, which reduces power conversion efficiency. However, since the switching timing needs to vary depending on changes in load or changes in operating environment, adaptive control thereof is difficult.

In a DC-to-DC converter, a voltage of a common node of a high-voltage side transistor and a low-voltage side transistor is compared with a reference voltage through a zero current detection circuit to detect a zero current point at which the energy storage element has completed discharging, thereby adaptively controlling the switching timing. However, in some cases, the detected zero current point may have an error from an actual zero current point due to an offset or delay occurring in a comparator of the zero current detection circuit, errors or delays during manufacturing of internal elements, etc. Efficiency of the DC-to-DC converter is limited due to errors that are not reflected in the design and are unpredictable.

SUMMARY OF THE INVENTION

It is an object of the proposed invention to calibrate a detection error of a zero current detection circuit.

Furthermore, it is another object of the proposed invention to provide a zero current detection circuit that may detect a zero current point with high accuracy while operating at low power.

Furthermore, it is a further object of the proposed invention to provide a power conversion circuit having low self-consumption power and improved conversion efficiency.

According to an aspect, a zero current detection circuit, to which a calibration circuit configured to calibrate an offset error thereof is added, is proposed. According to the aspect, an offset calibration circuit detects a delay between an output point of the zero current detection circuit and a moment of change in the voltage of the common node and outputs a calibration signal accordingly.

According to another aspect, the zero current detection circuit may include a pre-amplifier in which a differential voltage is calibrated according to an offset control signal and a phase comparator that detects a zero current point from the differential voltage.

According to still another aspect, the zero current detection circuit includes a plurality of dynamic comparators, and operating clocks of the dynamic comparators may be generated by a plurality of flip-flops configured to latch output of each dynamic comparator and supply the output to a clock of a dynamic comparator at a rear stage.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The foregoing and additional aspects are embodied using embodiments described with reference to the accompanying drawings. It is understood that components of each embodiment may be combined in various ways within the embodiment or with components of other embodiments as long as there is no other mention or contradiction therebetween. Terms used in this specification and claims need to be interpreted as having meanings and concepts consistent with the description or proposed technical idea based on the principle that the inventor may appropriately define the concept of the terms in order to describe the invention of the inventor in the best way. Hereinafter, preferred embodiments of the present invention will be described in detail with reference to the attached drawings.

Claim 1: Description of the Invention

Figure 1:
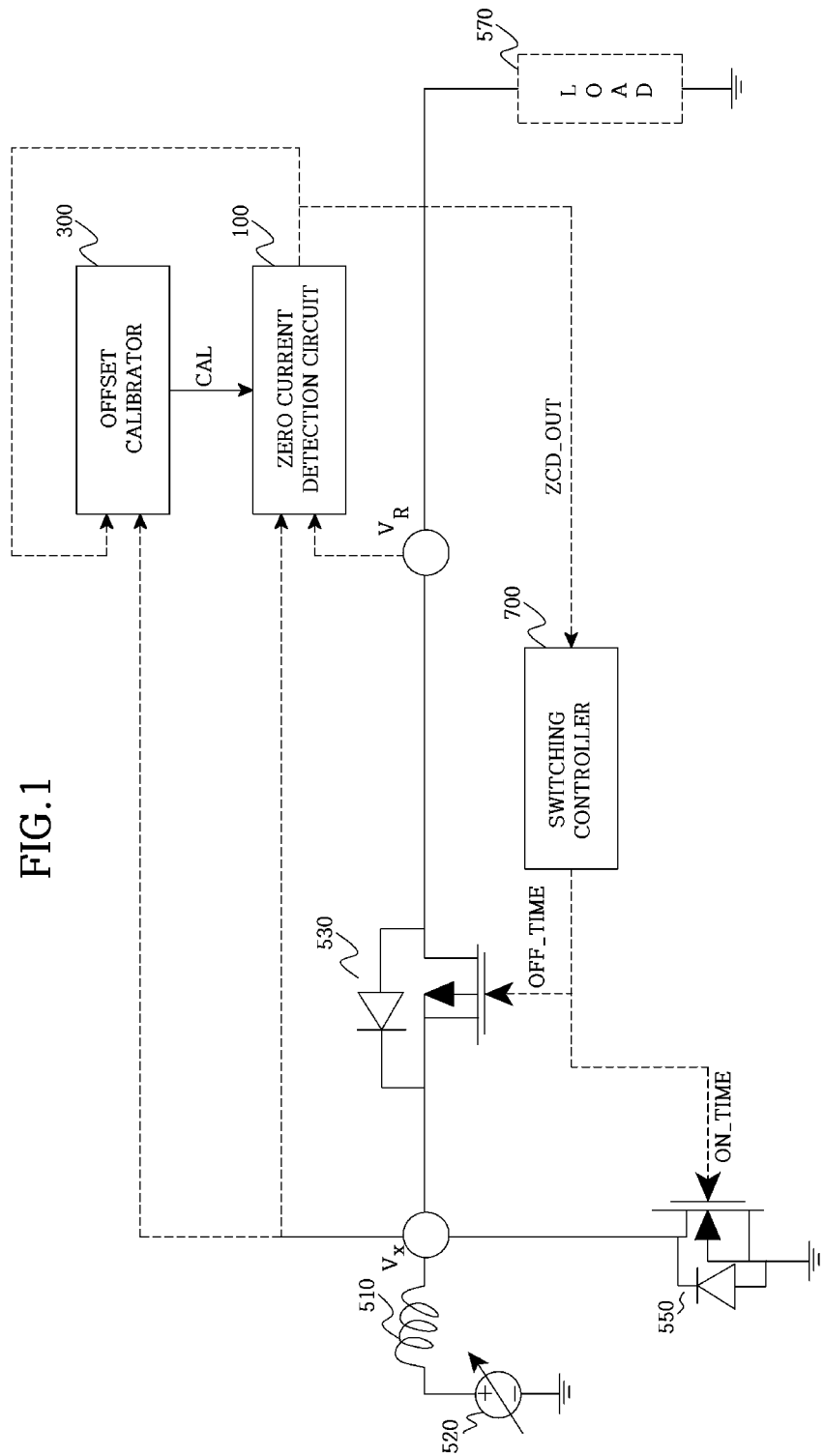
FIG. 1 is a block diagram illustrating a configuration of a power converter according to an embodiment.

According to an aspect, a zero current circuit to which a calibration circuit that calibrates an offset error is added is proposed. An embodiment of a power converter to which a zero current circuit according to an embodiment is applied is illustrated in FIG. 1. In the drawing, a solid line indicates a power signal flow, and a broken line indicates a sensing input or control signal flow. The illustrated embodiment is a boost type power converter. However, the proposed invention is not limited thereto and may be applied to a buck type power converter. The boost type power converter is also referred to as a step-up converter, and is a DC-to-DC converter that increases voltage while reducing current.

As illustrated in the figure, the power converter according to an embodiment includes an energy storage element 510, a high-voltage side power switch 530, a low-voltage side power switch 550, a switching controller 700, and a zero current detection circuit 100. The low-voltage side power switch 550 switches charging of the energy storage element 510, here, an inductor with input power. The high-voltage side power switch 530 switches discharge of power with which the energy storage element 510, that is, the inductor, is charged to a load. The switching controller 700 generates and outputs a switching control signal OFF_TIME signal that controls on and off of the high-voltage side power switch 530 and a switching control signal ON TIME signal that controls on and off of the low-voltage side power switch 550. The zero current detection circuit 100 compares output of a common node VX with output of a reference node VR to detect a zero current moment and outputs a detection signal ZCD_OUT signal to the switching controller 700. Here, the common node VX is a node to which the high-voltage side power switch 530 and the low-voltage side power switch 550 are commonly connected, and the reference node VR is a node at which a signal subjected to crossing a common node voltage is input in the zero current detection circuit 100 and is an output node in a booster converter.

During a charging period in which an ON TIME signal is activated and an OFF-TIME signal is deactivated, where the signals are mutually exclusive, the low-voltage side power switch 550 is turned on and the high-voltage side power switch 530 is turned off, so that the energy storage element 510 is charged with input power supplied from a power source 520. During a discharging period in which the ON TIME signal is deactivated and the OFF-TIME signal is activated, the low-voltage side power switch 550 is turned off and the high-voltage side power switch 530 is turned on, so that power with which the energy storage element 510 is charged is discharged to a load 570. To increase power conversion efficiency, the charging period needs to be set so that the energy storage element is sufficiently charged to utilize a capacity thereof, and the discharging period needs to be set so that the energy storage element is completely discharged. The switching controller 700 generates and outputs these switching signals on its own according to a maximum power point tracking control algorithm, etc., and the zero current detection circuit 100 compares an actual common node voltage with a reference node voltage to complement a control algorithm of the switching controller 700 accordingly. As a result, a well-designed power converter may achieve power conversion efficiency close to 90%. Since a configuration of this booster converter is well-known technology, a detailed description thereof is omitted.

The power converter further includes an offset calibrator 300. Here, an offset refers to an error, that is, a time difference, between a zero current point detected by the zero current detection circuit and the actual zero current point. This offset is generally an offset occurring in a comparator due to design deviation of an input transistor MOSFET in an amplifier and the comparator included in the zero current detection circuit or a change in supply power. However, this offset may be generated due to internal delay of the device. According to an aspect, an offset calibration circuit detects an error between an output time of the zero current detection circuit and a falling time of a voltage of the common node and outputs a calibration signal accordingly to the zero current detection circuit 100.

In an embodiment, the zero current detection circuit 100 includes a calibration circuit that calibrates the offset according to the input calibration signal. In an embodiment, the zero current detection circuit may include a pre-amplifier and a comparator. The comparator detects an intersection of two input signals, and the pre-amplifier may increase sensitivity of intersection detection by amplifying the input signal. According to an aspect, the zero current detection circuit may include a detection calibration circuit. The calibration circuit may be, for example, a variable voltage generation circuit that adds an offset voltage proportional to the delay amount, that is, a calibration input value, during differential amplification in the pre-amplifier. As another example, the calibration circuit may be a variable voltage generation circuit that reflects the input calibration signal by adding an asymmetric offset to one input signal in the comparator.

Claim 2: Description of the Invention

Figure 2:
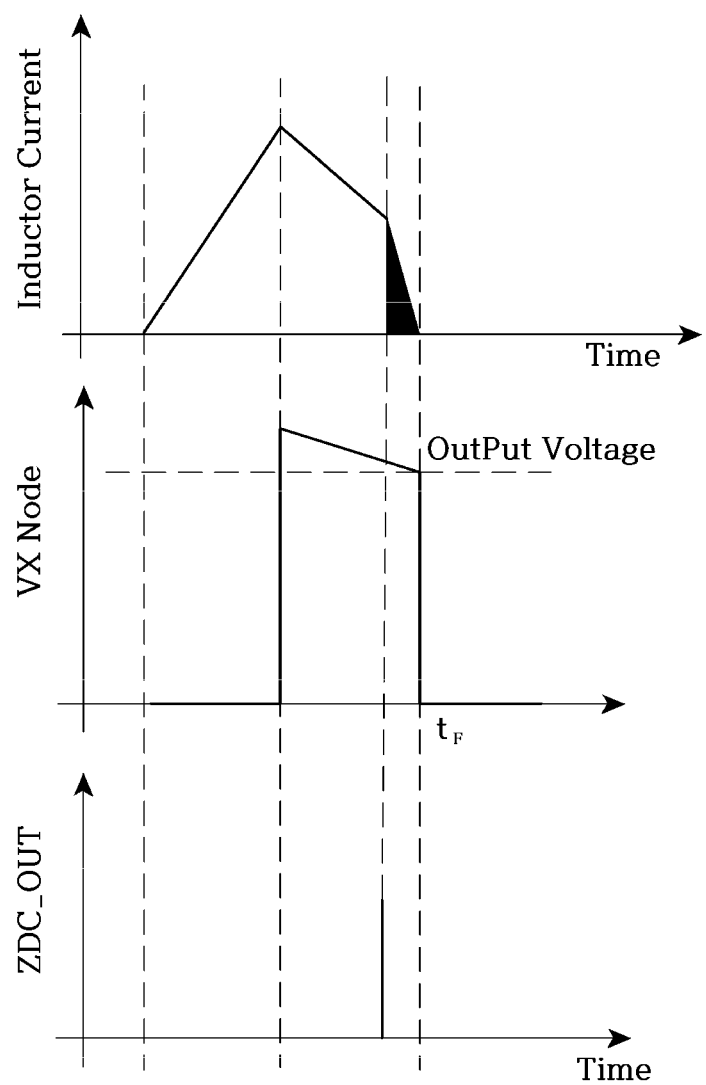
FIG. 2 is a waveform diagram illustrating an early state in which output of a zero current circuit is earlier than a common node signal and a change in an inductor current.
Figure 3:
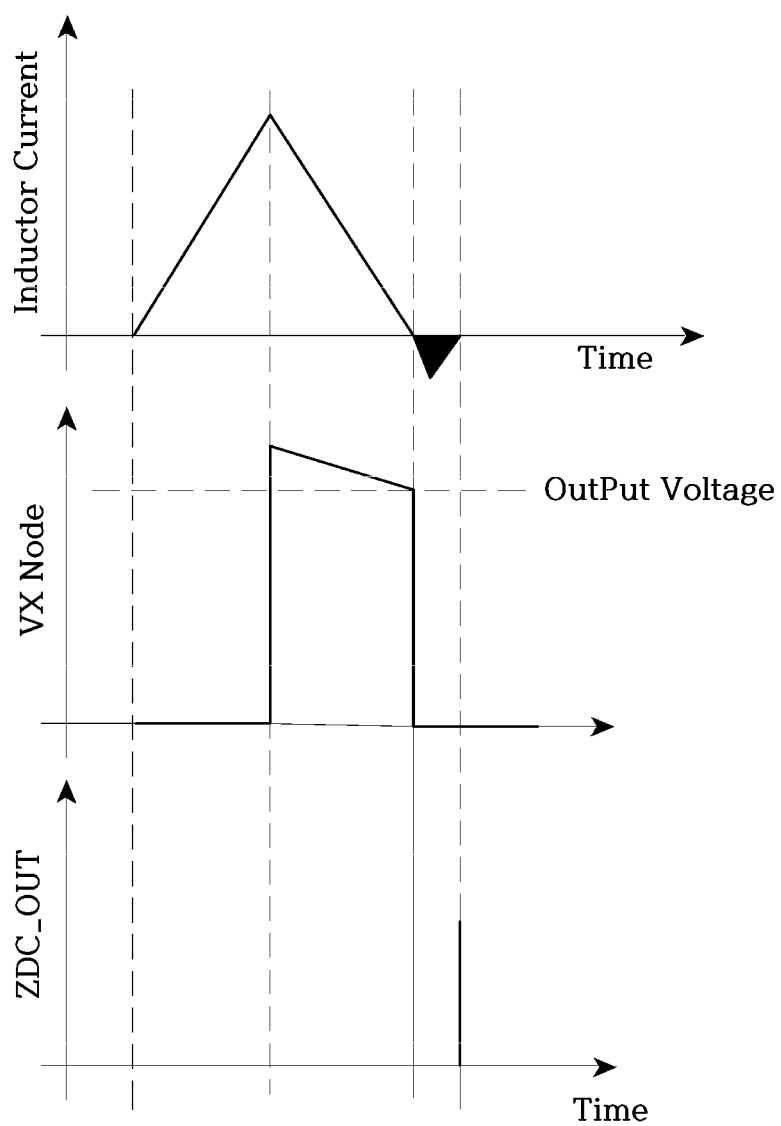
FIG. 3 is a waveform diagram illustrating a late state in which output of the zero current circuit is later than the common node signal and a change in an inductor current.

FIGS. 2 and 3 are each a waveform diagram for describing a relationship between an inductor current and an offset between the common node voltage and an output of the zero current detection circuit in a booster converter. In the booster converter of FIG. 1, as the low-voltage side power switch (550, NMOS transistor) turns on, the inductor is charged with current, and as the high-voltage side power switch (530, PMOS transistor) turns on, the inductor current is discharged to the load. The common node voltage starts at a higher voltage than an output voltage indicated by a dotted line, and falls to near a ground voltage while depicting a waveform that becomes equal to the output voltage and falls when discharge is completed.

FIG. 2 is a waveform diagram illustrating an early state in which output of the zero current circuit is earlier than a common node signal and a change in an inductor current. As can be seen from the inductor current waveform, inductor discharge ends early, resulting in loss conversion efficiency. FIG. 3 is a waveform of power diagram illustrating a late state in which output of the zero current circuit is later than the common node signal and a change in an inductor current. As can be seen from the inductor current waveform, even though inductor discharge has ended, since the high-voltage side power switch 530 continues to be turned on, reverse current flows and a loss of power conversion efficiency occurs.

The proposed invention calibrates the zero current circuit using the properties of the common node voltage. To this end, according to an aspect, the offset calibrator 300 may include a phase detector. The phase detector receives an output signal of the zero current detection circuit and a falling time signal of common node output and detects an error between the two signals.

Claims 3 and 5: Description of the Invention

Figure 4:
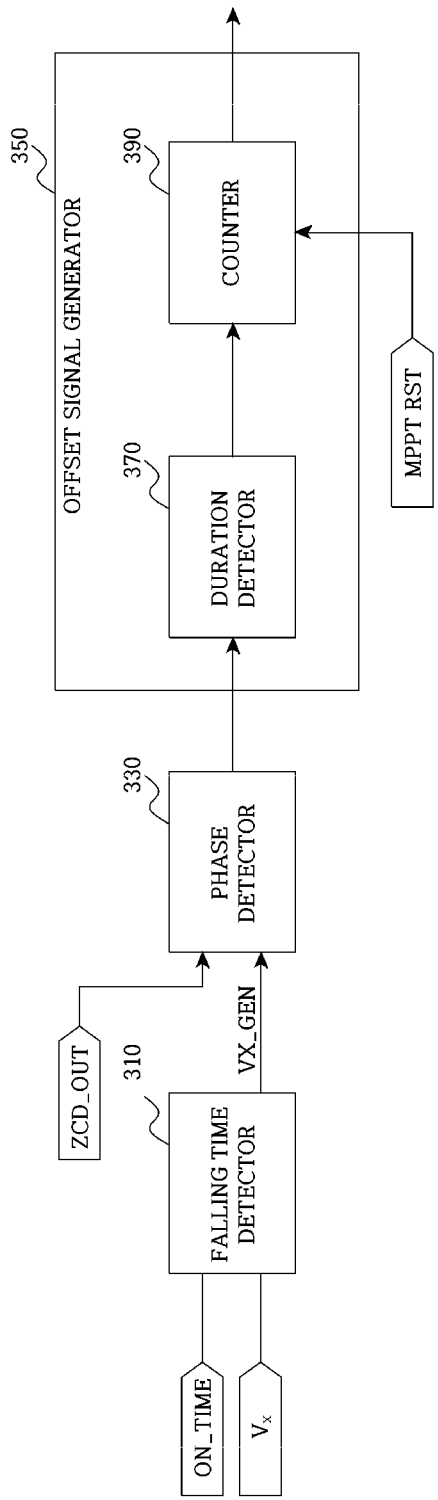
FIG. 4 is a block diagram illustrating a configuration of an offset calibrator according to an embodiment.

FIG. 4 is a block diagram illustrating a configuration of an offset calibrator according to an embodiment. As illustrated in the figure, the offset calibrator 300 according to an embodiment may include a falling time detector 310, a phase detector 330, and an offset signal generator 350.

The falling time detector 310 receives a voltage of the common node VX and detects a falling time thereof. In this instance, the falling time detector 310 may detect a moment of change based on the ON TIME signal, which is a signal output by the switching controller 700.

Figure 5:
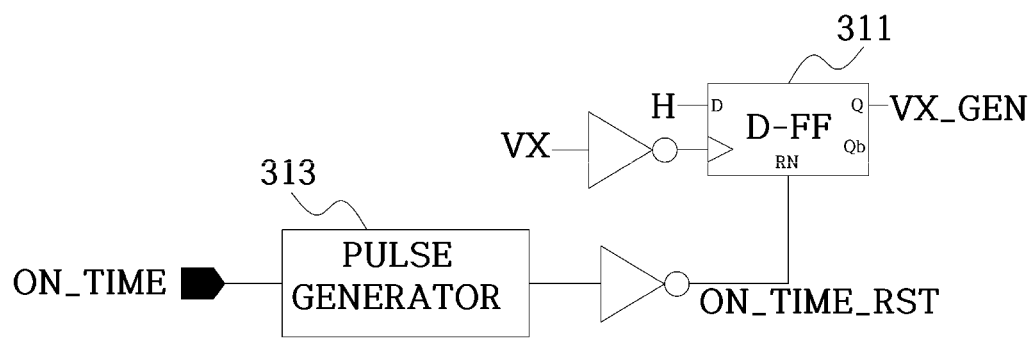
FIG. 5 illustrates an embodiment of a falling time detector.

FIG. 5 illustrates an embodiment of the falling time detector 310. In the illustrated embodiment, the falling time detector 310 detects a moment when the voltage of the common node VX falls, that is, a moment when the voltage gradually falls to the output node voltage and then abruptly falls to near the ground voltage. In FIG. 2, this time point is indicated by tF. As illustrated in FIG. 5, the falling time detector 310 according to an embodiment includes a D-flip-flop 311. This D-flip-flop 311 has a data input terminal to which a digital value "1" is input and a clock input terminal to which the voltage of the common node VX is applied. Output of a pulse generator 313 configured to receive the ON TIME signal, which is a signal output by the switching controller 700, and generate and output a short pulse at a moment when the signal is activated is applied to a reset input terminal RN of the D-flip-flop 311 via an inverter. Here, the reset input terminal RN is input, which is reset when a digital value "0" is input. The pulse generator 313 outputs a short pulse at a moment when the ON_TIME signal is input as a clock. Accordingly, an output VX_GEN signal of the falling time detector 310 is switched to the value of "1" at a moment when the voltage of the common node VX abruptly falls to near the ground voltage and returns to the value of "0" by being reset at a moment when the ON_TIME signal, which is the signal output by the switching controller 700, is activated, and eventually the falling time detector 310 outputs a short pulse at a moment when the voltage of the common node VX rapidly falls.

Figure 6:
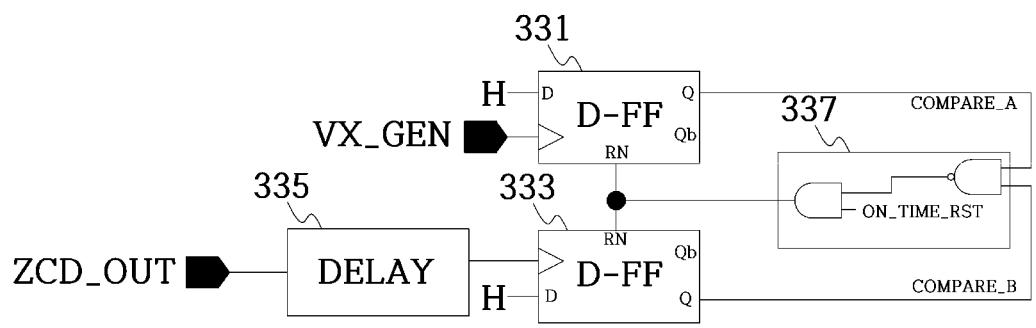
FIG. 6 illustrates an embodiment of a phase detector.

Returning to FIG. 4 again, the phase detector 330 between output of the zero current detects an error detection circuit 100 and output of the falling time detector 310. FIG. 6 illustrates an embodiment of the phase detector. This phase detector is also referred to as a phase frequency detector (PFD), and is a circuit commonly known to be applied to a phase locked loop (PLL). As illustrated in the figure, the phase detector 330 includes a D-flip-flop 331 that outputs a pulse when a VX_GEN signal, which is an output signal of the falling time detector 310, is input. An output COMPARE A signal reflects the timing of the VX_GEN signal. In addition, the phase detector 330 includes a delay 335 that delays the ZCD_OUT signal, which is an output signal of the zero current detection circuit 100, and a D-flip-flop 333 that outputs a pulse when the delayed ZCD_OUT signal is input. The VX_GEN signal, which is the output signal of the falling time detector 310, is generated using the structure illustrated in FIG. 5 when compared to the output signal of the zero current detection circuit 100, and thus additional delay occurs. The delay 335 is added to compensate for this delay. An output COMPARE B signal of the D-flip-flop 333 reflects the timing of the ZCD_OUT signal. Outputs of the two D-flip-flops 331 and 333 are both "1" or reset at a moment when an ON_TIME_RST signal, which is output of the pulse generator 313 configured to generate and output a short pulse at a moment when the ON_TIME is activated in the circuit illustrated in FIG. 5, is activated. Here, the reset input terminals RN and RN are inputs, which are reset when the digital value "0" is input. Accordingly, the COMPARE_A signal is activated at a moment when the common node voltage rapidly falls to a ground level, and the COMPARE_B signal is activated at a moment when the output of the zero current detection circuit is output and is reset at a moment when both signals are activated or the ON_TIME_RST signal is activated.

Returning to FIG. 4 again, the offset signal generator 350 outputs an offset control signal proportional to a detected phase difference. For example, the offset control signal may be an analog signal having a voltage proportional to the detected phase difference. As another example, the offset control signal may be a pulse signal having a length proportional to the detected phase difference. As another example, the offset control signal may be a binary signal having a value proportional to the detected phase difference.

Figure 7:
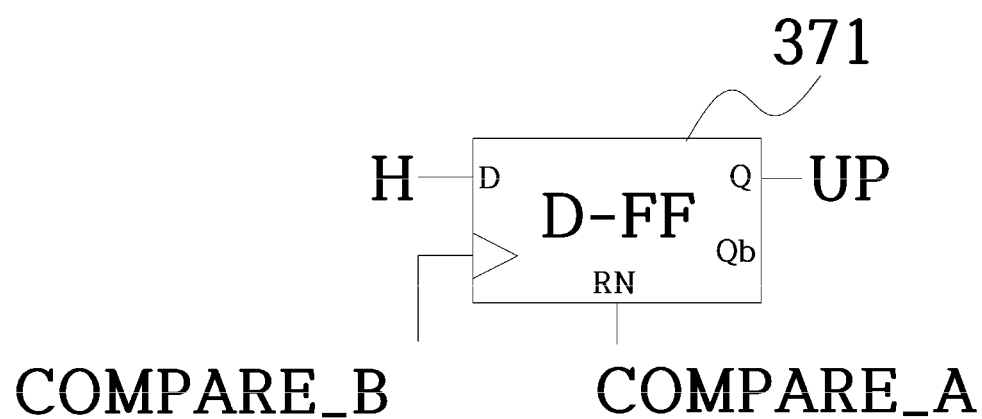
FIG. 7 illustrates an embodiment of a duration detector.

In the illustrated embodiment, the offset signal generator 350 may include a duration detector 370 and a counter 390. The duration detector 370 detects duration of a phase difference signal output by the phase detector 330. The counter 390 outputs an offset control signal that increases in the duration detected by the duration detector 370. FIG. 7 illustrates an example of the duration detector. As illustrated in the figure, the duration detector 370 includes a D-flip-flop that is converted to "1" when the COMPARE_A signal among the outputs of the phase detector 330 is input and is reset when the COMPARE_B signal is deactivated. Here, the reset input terminal RN is an input that is reset when a digital value "0" is input. Since the COMPARE_B signal is reset when both an output ZCD_OUT of the zero current detection circuit and the falling time of the common node output arrive, and the COMPARE_A signal reflects a falling time of output of the common node, an "UP" signal output by the duration detector 370 remains active between the falling time of the common node output and an activation point of both signals.

The counter 390 increases when an UP signal is output from the duration detector 370. That is, the counter 390 increases whenever the output of the zero current detection circuit 100 is in an early state. When the output of the zero current detection circuit 100 is stabilized and locked, the counter 390 maintains a constant value. Therefore, the counter 390 may be reset when the zero current detection circuit restarts or when relocking is required due to abrupt fluctuation. In the illustrated embodiment, the output of the counter 390 starts at 0, gradually increases when an offset in the form of an early delay occurs in an inductor current IL, and then maintains the same value by being locked when the offset is resolved. In an embodiment, the counter 390 may be reset by an MPPT_RST signal output when a maximum power point tracking algorithm in the switching controller 700 of FIG. 1 is reset.

Claims 4 and 6: Description of the Invention

Figure 8:
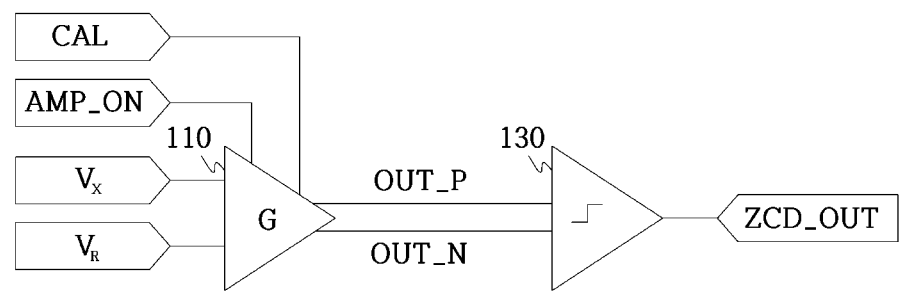
FIG. 8 illustrates an embodiment of a zero current detection circuit.

According to an aspect, a differential voltage in the pre-amplifier of the zero current detection circuit may be adjusted according to the offset control signal. FIG. 8 illustrates an embodiment of a zero current detection circuit to which this aspect is applied. The zero current detection circuit according to an embodiment may include a pre-amplifier 110 that differentially amplifies voltages of the common node and the reference node and a phase comparator 130 that detects a zero current point from the amplified differential voltages. The pre-amplifier differentially amplifies the voltages of the common node VX and the reference node VR, and adjusts the differential voltages according to an offset control signal CAL. The phase comparator 130 receives the differential voltages and detects the zero current point.

Claims 7 and 8: Description of the Invention

Figure 9:
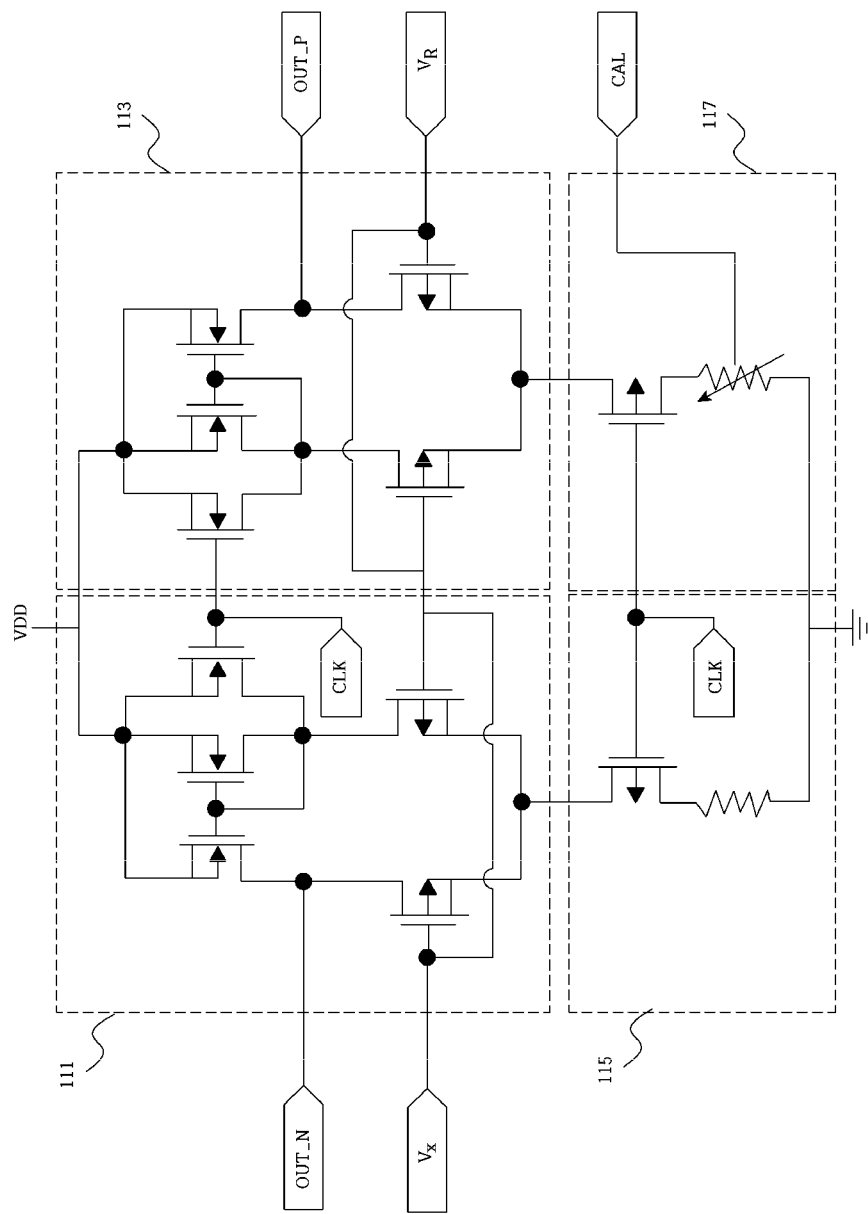
FIG. 9 is a circuit diagram illustrating a configuration of a pre-amplifier according to an embodiment.

FIG. 9 is a circuit diagram illustrating a configuration of a pre-amplifier according to an embodiment. As illustrated in the figure, the pre-amplifier according to the embodiment includes a first differential amplifier 113, a second differential amplifier 111, and a common current controller 117. The first differential amplifier 113 differentially amplifies voltages of the common node VX and the reference node VR and outputs a positive differential voltage (OUT_P). The second differential amplifier 111 differentially amplifies voltages of the common node VX and the reference node VR and outputs a negative differential voltage (OUT N).

A current limiting circuit 115, to which a clock signal that switches an operation of the circuit while limiting a common emitter current to a certain level is applied, is connected between a lower node and a ground terminal of the first differential amplifier 113. A common current adjuster 117, to which a clock signal that switches an operation of the circuit while adjusting the common emitter current according to the offset control signal CAL is applied, is connected between a lower node and a ground terminal of the second differential amplifier 111. However, the present invention is not limited thereto, and the common current adjuster 117 may be implemented in various forms such as a circuit that assigns a bias to one of input or output on one side in the pre-amplifier, for example, a voltage addition circuit or a current adjustment circuit. In addition, the common current adjuster 117 may be added to the first differential amplifier a 111. In the illustrated embodiment, the common current adjuster 117 is connected between a common terminal and a power terminal, here a ground terminal, of the second differential amplifier 111, and may be implemented as an array resistor in which connection of each corresponding resistor is switched by each bit of counter output. However, the common current adjuster 117 may be connected between an upper node and a power terminal, here a VDD terminal, of the differential amplifier.

In the embodiments illustrated in FIGS. 8 and 9, the pre-amplifier and the phase comparator in the illustrated zero current detection circuit may each be a dynamic comparator. The dynamic comparator has an advantage of higher latching speed and lower static power consumption than those of a static comparator due to positive feedback.

Claims 10, 11, and 12: Description of the Invention

According to another aspect of the proposed invention, the zero current detection circuit includes a plurality of dynamic comparators, and operating clocks of the dynamic comparators may be generated by a plurality of flip-flops configured to latch output of each dynamic comparator and supply the output to a clock of a dynamic comparator at a rear stage.

Figure 10:
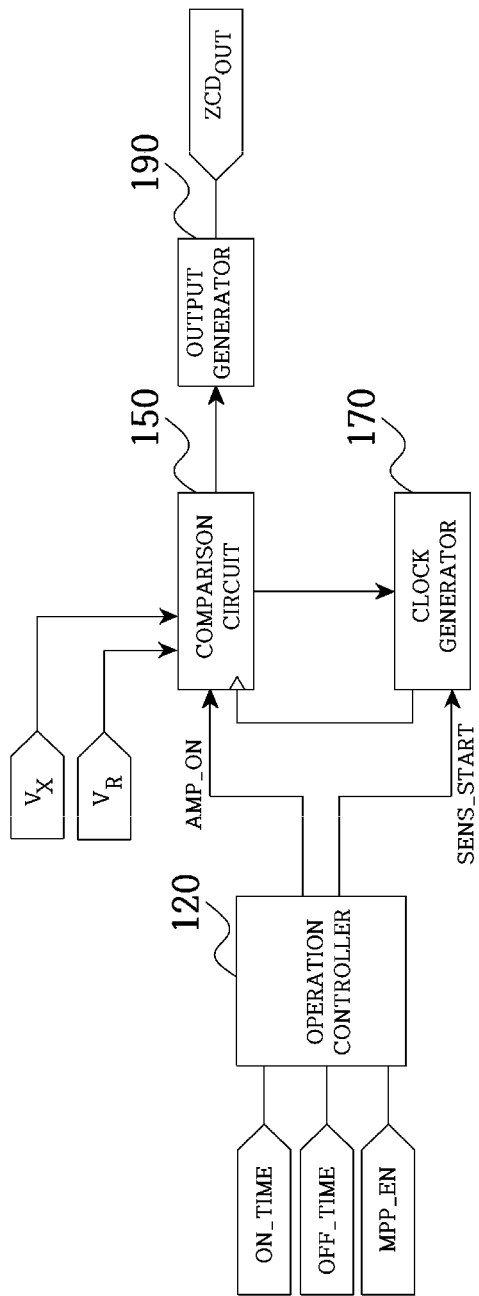
FIG. 10 is a block diagram illustrating a configuration of the zero current detection circuit according to another embodiment.

FIG. 10 is a block diagram illustrating a configuration of the zero current detection circuit according to another embodiment. As illustrated in the figure, the zero current detection circuit according to another embodiment includes a comparison circuit 150, a clock generator 170, and an output generator 190. The comparison circuit 150 receives a switching node voltage and an output node voltage of the boost type power converter and detects a zero current state. The comparison circuit 150 according to an embodiment may include a plurality of dynamic comparators. Each the dynamic comparators may have a structure similar to that of the embodiment illustrated in FIG. 8. In an embodiment, each dynamic comparator includes a pre-amplifier that differentially amplifies the voltages of the common node and the reference node and adjusts differential voltages according to an offset control signal and a phase comparator that receives the output differential voltages and detects a zero current point.

The clock generator 170 is a circuit for generating a clock signal necessary for the comparison circuit 150 to operate. The output generator 190 generates and outputs a zero current detection signal from output of the comparison circuit 150. The operation controller 120 receives the ON_TIME signal and the OFF_TIME signal among outputs of the switching controller 700 in the boost type power converter illustrated in FIG. 1 and an MPP_EN signal that activates a maximum power tracking algorithm inside the switching controller 700, and generates and outputs an AMP_ON signal, which is a control signal that activates the operation of the comparison circuit 150, and a SENS_START signal that activates the operation of the clock generator 170.

Figure 11:
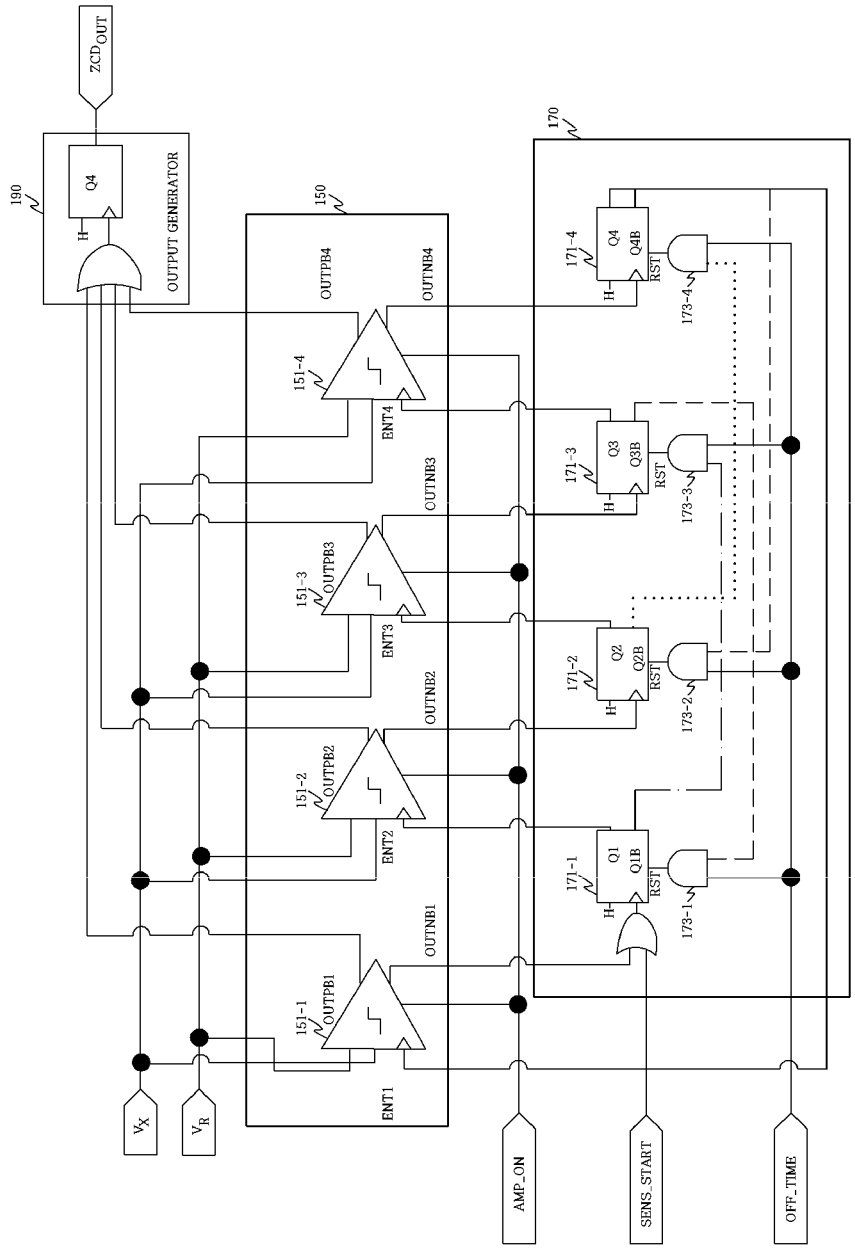
FIG. 11 illustrates a more detailed configuration of a comparison circuit, a clock generator, and an output generator in the embodiment of FIG. 10.

FIG. 11 illustrates a more detailed configuration of the comparison circuit, the clock generator, and the output generator in the embodiment of FIG. 10. Similar components corresponding to the embodiment illustrated in FIG. 10 are referred to by the same reference numerals. In the comparison circuit 150, the switching node and the output node of the boost type power converter, which are a pair of detection nodes, are connected to an input terminal of each dynamic comparator. In the illustrated embodiment, one end of the low-voltage side power switch of the boost type power converter is connected to one input terminal of each of the dynamic comparators 151-1, . . . , 151-4 to apply a low-voltage side voltage VX thereto, and one end of the high-voltage side power switch of the boost type power converter is connected to the other input terminal of each of the dynamic comparators 151-1, . . . , 151-4 to apply and a high-voltage side voltage VR thereto.

The clock generator 170 is a circuit for generating a clock signal necessary for the comparison circuit 150 to operate. The clock generator 170 includes a plurality of flip-flops 171-1, . . . , 171-4. Each of the flip-flops receives output of a dynamic comparator at a front stage as a clock signal and outputs the output as a clock input of a dynamic comparator at a rear stage. For example, the flip-flop Q1 171-1 receives output of the dynamic comparator 151-1 at a front stage as a clock signal and outputs the output as a clock input of the dynamic comparator 151-2 at a rear stage, the flip-flop Q2 171-2 receives output of the dynamic comparator 151-2 at a front stage as a clock signal and outputs the output as a clock input of the dynamic comparator 151-3 at a rear stage, the flip-flop Q3 171-3 receives output of the dynamic comparator 151-3 at a front stage as a clock signal and outputs the output as a clock input of the dynamic comparator 151-4 at a rear stage, and the flip-flop Q4 171-4 receives output of the dynamic comparator 151-4 at a front stage as a clock signal and outputs the output as a clock input of the dynamic comparator 151-1 at a rear stage.

From another perspective, an output pulse of the first dynamic comparator generates a clock input signal of the second dynamic comparator, an output pulse of the second dynamic comparator generates a clock input signal of the third dynamic comparator, an output pulse of the third dynamic comparator generates a clock input signal of the fourth dynamic comparator, and an output pulse of the fourth dynamic comparator generates a clock input signal of the first dynamic comparator. Accordingly, the plurality of dynamic comparators 151-1, . . . , 151-4 and the plurality of flip-flops 171-1, . . . , 171-4 are included in a clock loop as a whole. Clock signals of different phases are sequentially input to the respective dynamic comparators, and each dynamic comparator detects a zero current at moment when the clock signal is activated and outputs a detection pulse. By generating a clock necessary for the dynamic comparator to operate without a separate oscillator, the chip area and power consumption may be reduced.

The output generator 190 logically sums outputs of a plurality of dynamic comparators and outputs the logical sum. Therefore, when at least one dynamic comparator among the plurality of dynamic comparators 151-1, . . . , 151-4 detects a zero current and outputs a pulse, the output generator 190 may output the pulse to the outside through one output terminal.

Figure 12:
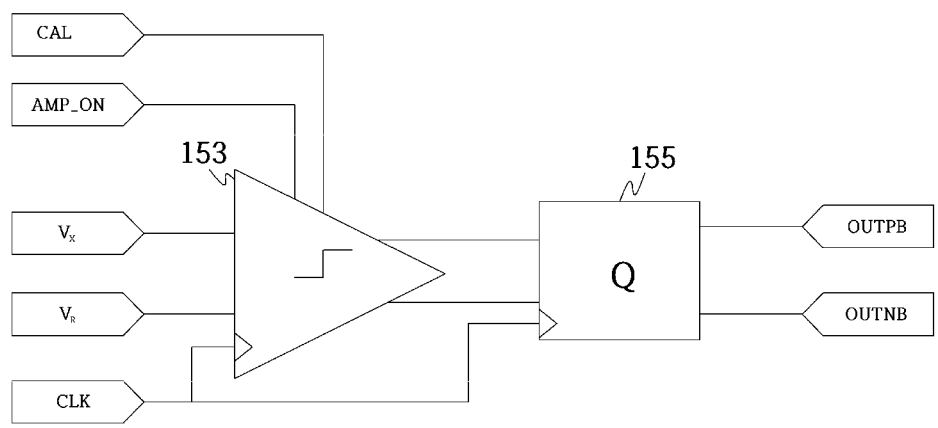
FIG. 12 illustrates a configuration of an embodiment of a dynamic comparator in an embodiment of FIG. 11.

FIG. 12 illustrates a configuration of an embodiment of the dynamic comparator in the embodiment of FIG. 11. As illustrated in the figure, the dynamic comparator according to the embodiment includes a pre-amplifier 153 and a dynamic latch 155.

The pre-amplifier 153 receives a switching node voltage VX and an output node voltage VR of the power converter and outputs a difference voltage between both end voltages, and the dynamic latch 155 receives the output voltage of the pre-amplifier 153 and outputs a zero current detection OUTPB pulse signal at a moment when the voltages at both ends of the switching node and the output node cross through comparison.

In the case of the boost type power converter, a voltage is detected at a moment when the inductor is charged with power from the input, that is, a moment when the voltage is high, and thus a pre-amplifier is installed to ensure stable comparator operation. The pre-amplifier ensures stable operation of the dynamic latch 155 by differentially amplifying the voltages of the switching node voltage VX and the output node voltage VR and further lowering the voltages by a gain value. In addition, the comparison circuit 150 includes the plurality of dynamic comparators 151-1, . . . , 151-4, and the dynamic comparator has an advantage of consuming less current than that of the static comparator. These four dynamic comparators do not simultaneously operate, and sequentially operate one at a time.

In the illustrated embodiment, the pre-amplifier 153 operates while the AMP_ON signal is activated to differentially amplify input signals. When the AMP_ON signal is deactivated, internal current flow is cut off, minimizing power consumption. The dynamic latch 155 synchronizes with an input clock and outputs a pulse at a moment when output of the pre-amplifier 153 becomes 0. The pre-amplifier 153 determines an offset voltage, and the dynamic latch 155 determines a speed of the comparator. Since the configuration of this dynamic comparator is known, a detailed description is omitted.

Returning to FIG. 11, output of a front flip-flop in the clock loop is connected to a reset terminal RST of each of the flip-flops 171-1, . . . , 171-4 of the clock generator 170. In the illustrated embodiment, negative output of the flip-flop 171-3 is connected to the reset terminal of the flip-flop 171-1, negative output of the flip-flop 171-4 is connected to the reset terminal of the flip-flop 171-2, negative output of the flip-flop 171-1 is connected to the reset terminal of the flip-flop 171-3, and negative output of the flip-flop 171-2 is connected to the reset terminal of the flip-flop 171-4. In the illustrated embodiment, even though two front outputs are connected, this is selection in terms of design, and a determination may be made depending on the design of a pulse width of an output pulse.

According to an additional aspect, each flip-flop of the clock generator is configured to enable reset according to the output of the front flip-flop on the loop while the high-voltage side power switch is discharging to the load. In FIG. 11, the clock generator 170 includes a plurality of logical product elements 173-1, . . . , 173-4. Output of each of the logical product elements 173-1, 173-4 is connected to a reset terminal of one flip-flop, and an output terminal of a flip-flop in front of the flip-flop in the loop and an output terminal of an off-time generator are connected to input terminals thereof. Accordingly, resetting is allowed when the OFF-TIME signal is in an active state, that is, while the high-voltage side power switch is connected and inductor power is discharged to the load.

Figure 13:
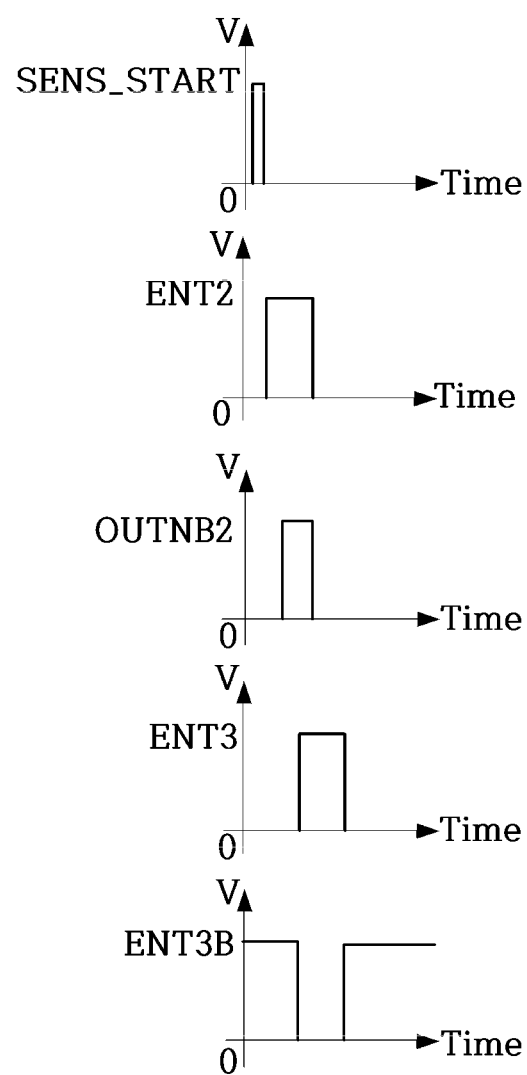
FIG. 13 is a timing diagram for describing an operation of the clock generator.

FIG. 13 is a timing diagram for describing an operation of the clock generator 170. As illustrated in the figure, the dynamic comparator 151-2, which starts a first operation, receives the SENS_START signal as a clock, so that output ENT2 of the flip-flop Q1 is generated, and in the case of not being a point where the switching node voltage VX and the output node voltage VR intersect, as negative output OUTNB2 is generated among outputs of the dynamic comparator 151-2 that receives an ENT2 signal, the second flip-flop Q2 operates to output an output ENT3 signal thereof, and as the output ENTB3 signal is turned off, the ENT2 signal turns off. This is repeated in the order ENT2→ENT3→ENT4→ENT1 until a moment when the switching node voltage VX and the output node voltage VR intersect, and when a pulse is generated by detecting a moment at which any one of outputs of the four dynamic comparator 151-1, . . . , 151-4 intersects, the ZCD_OUT signal is generated in the output generator 190.

Figure 14:
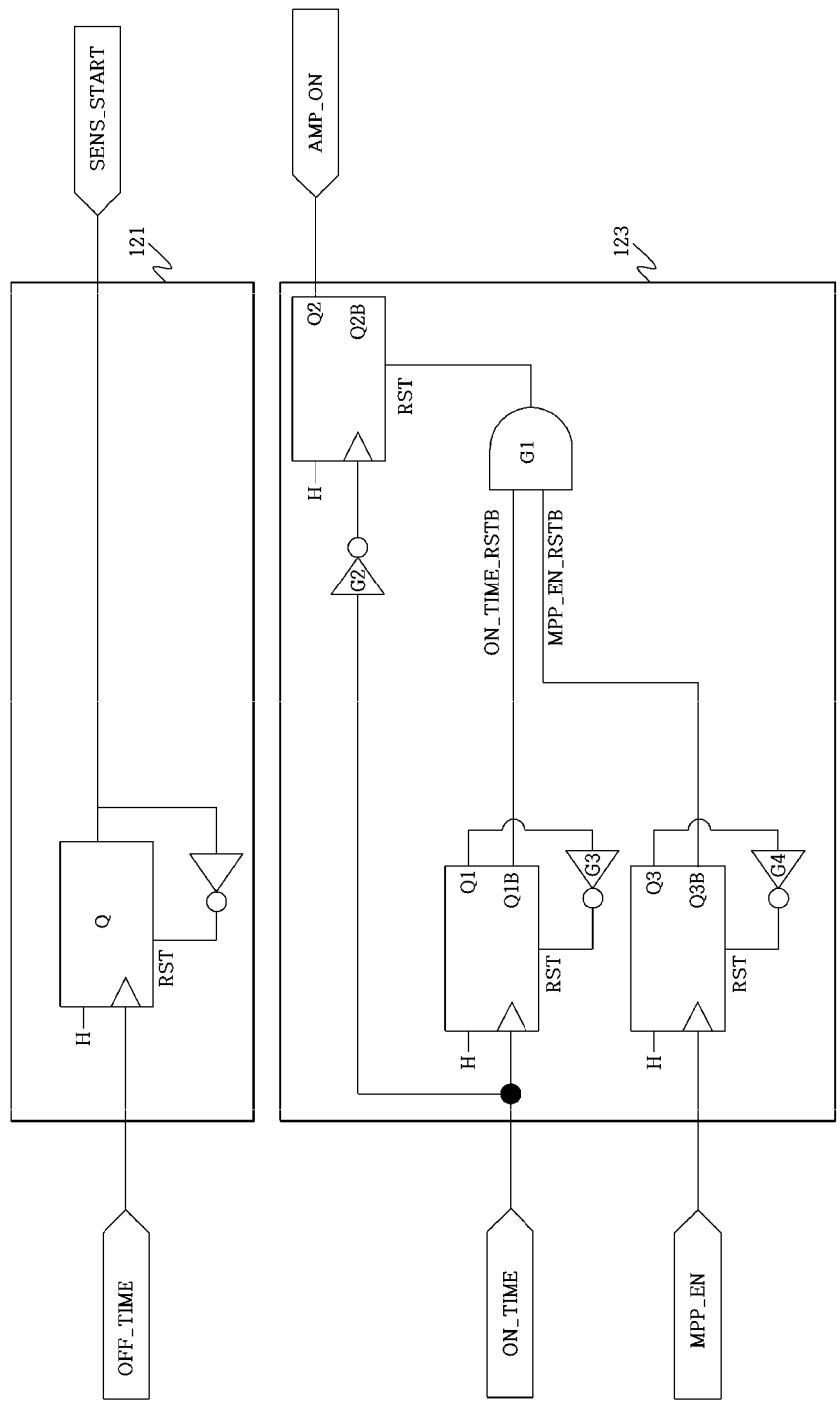
FIG. 14 illustrates a configuration of an operation controller according to an embodiment.
Figure 15:
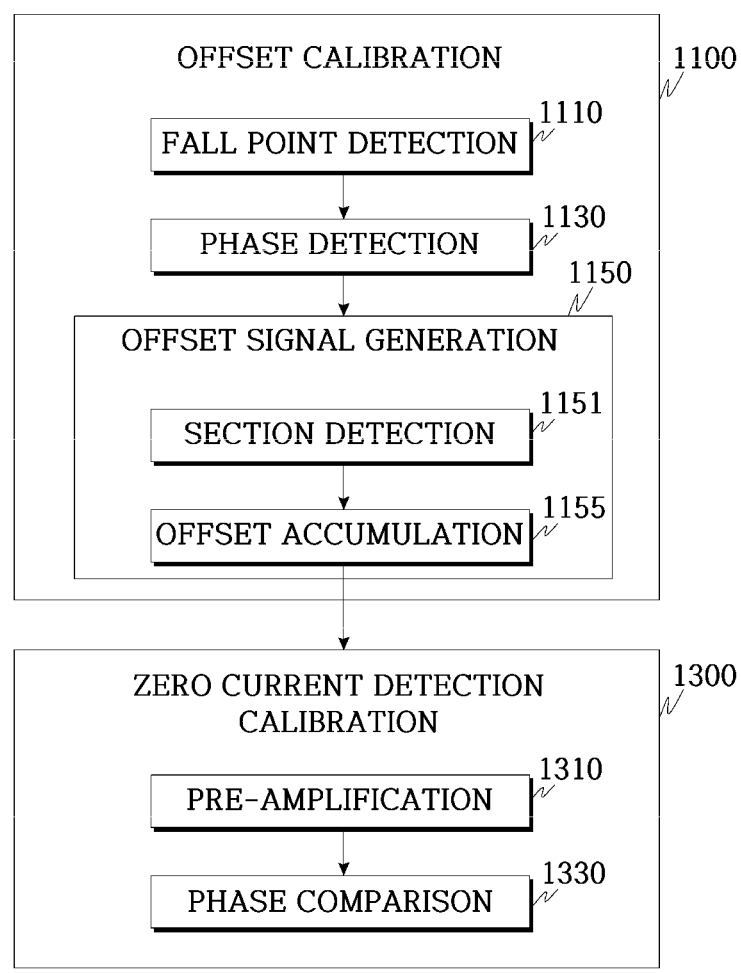
FIG. 15 is a flowchart illustrating a configuration of a power conversion control method according to an embodiment.

According to a further aspect, the boost type power converter may be controlled such that the pre-amplifier of the dynamic comparator is turned on while the low-voltage side power switch is disconnected. Based on the boost type power converter to which the proposed invention is applied, the zero current detection circuit 100 needs to operate at a moment when a power switch on a high-voltage side is turned on. Therefore, to this end, the "SENS_START" signal and the "AMP_ON" signal are prepared so that the zero current detection circuit 100 may operate at a moment when the OFF_TIME signal is turned on. Returning to FIG. 10, according to this aspect, the boost type power converter according to an embodiment of the proposed invention may further include the operation controller 120. FIG. 14 illustrates a configuration of the operation controller according to the embodiment. As illustrated in the figure, the operation controller 120 includes a first operation controller 121. The first operation controller 121 outputs a control signal to activate the comparison circuit 150 while the ON_TIME output of the switching controller 700 of FIG. 1 is deactivated. Since the OFF_TIME signal is generated after the ON_TIME signal is turned off, the operation controller generates the AMP_ON signal to activate the pre-amplifier at a moment when the ON_TIME signal is turned off.

As illustrated in the figure, in the embodiment of FIG. 1, the ON_TIME signal, which is a control signal output by the switching controller 700, is input to a clock input terminal of the flip-flop Q2 through an inverter G2. Since a data input terminal of the flip-flop Q2 is fixed to a high state H at all times, output of the flip-flop Q2 transitions to the high state the ON_TIME signal transitions from the high state to a low state. In the embodiment of FIG. 1, when the ON_TIME signal, which is the control signal output by the switching controller 700, is deactivated, the low-voltage side power switch 550 is turned off and charging of a main inductor 510 with input power is suspended. In this instance, at almost the same time, the OFF_TIME signal output by the switching controller 700 is activated, and the high-voltage side power switch 530 is turned on, so that supply of power, with which the main inductor 510 is charged, to the load is started.

As illustrated in the figure, the first operation controller 121 may include the first flip-flop Q1 that turns on when the ON_TIME signal, which is output of the switching controller 700 of FIG. 1, is activated, and the second flip-flop Q2 that turns on when the ON_TIME signal is deactivated and is reset by negative output of the first flip-flop Q1. The generated output AMP_ON signal is applied to the pre-amplifier 153 of the comparison circuit 150, as illustrated in FIGS. 11 and 12.

A logic related to the flip-flops Q1 and Q3 of the operation controller 120 is a circuit that generates a signal to reset the flip-flop Q2 that generates the AMP_ON signal. While the MPP_EN signal and the ON_TIME signal are applied to the clock input terminals of the flip-flops Q1, Q3 and all the signals are activated, the zero current detection circuit does not operate, and the logic inside the zero current t detection circuit is reset to prevent malfunction. Specifically, since the data input terminals of the flip-flop Q2 and the flip-flop Q1 are fixed in the high state H at all times, when the ON_TIME signal transitions from the low state to the high state, the output of the flip-flop Q2 transitions to the high state. Accordingly, the pre-amplifier 153 of the comparison circuit 150 may start operating when an on-time signal ON_TIME is deactivated and be reset when the on-time signal ON_TIME is activated.

In addition, the operation controller 120 may further include a second operation controller 123. When the OFF_TIME signal, which is output of the switching controller 700 of FIG. 1, is activated, the second operation controller 123 outputs the SENS_START signal, which is a control signal that enables start of operation of the clock generator 170 of FIG. 11. The second operation controller 123 includes a flip-flop Q whose data input terminal is maintained in a high state H at all times. When the OFF_TIME signal output by the switching controller 700 is activated, the SENS_START signal is output in the form of a pulse.

Description of Method Invention

The power conversion method according to the embodiment is a power conversion method applicable to the power converter illustrated in FIG. 1. The illustrated power converter is not limited to the booster type and may be applied to the buck type or complex type. Hereinafter, a power conversion control method according to the proposed invention will be described, focusing on the power converter illustrated in FIG. 1.

As illustrated in the figure, the power conversion method according to the embodiment includes an offset calibration step 1100. In the offset calibration step 1100, the power converter detects an error between an output time of the zero current detection circuit and the falling time of the common node output and outputs a corresponding calibration signal to the zero current detection circuit.

According to an aspect, the offset calibration step 1100 may include a fall point detection step 1110, a phase detection step 1130, and an offset signal generation step 1150. In the falling time detection step 1110, the offset calibrator detects the falling time of the common node output. In the phase detection step 1130, the offset calibrator detects an error between output of the zero current detection circuit and the detected falling point. In the offset signal generation step 1150, the offset calibrator generates an offset control signal proportional to the detected error and outputs the offset control signal to the zero current detection circuit.

According to an additional aspect, the offset signal generation step may further include a section detection step 1151 and an offset accumulation step 1155. In the section detection step 1151, the offset calibrator detects the duration of the error detected in the phase detection step. In the offset accumulation step 1155, the offset calibrator counts duration detected in the section detection step and outputs a counted value as the offset control signal.

According to an additional aspect, the power conversion control method may include a zero current detection calibration step 1300 of adjusting zero current detection timing according to the offset control signal. In an embodiment, the zero current detection calibration step 1300 includes a pre-amplification step 1310 and a phase comparison step 1330. In the pre-amplification step 1310, the zero current detection circuit differentially amplifies the voltages of the common node and the reference node and adjusts the differential voltage according to the offset control signal. In the phase comparison step 1330, the zero current detection circuit receives the differential voltage and detects the zero current point. A specific description of this power conversion method is similar to that previously described in connection with the device invention.

According to the proposed invention, errors occurring due to the zero current detection circuit may be calibrated to further increase efficiency of the power converter. In addition, a power conversion circuit having low self-consumption power and improved conversion efficiency by adopting the dynamic comparator and generating a clock thereof has been proposed. Due to low power characteristics and high conversion efficiency, excellent characteristics may be exhibited even in sensitive applications such as energy harvesting.

In the above, the present invention has been described through embodiments with reference to the accompanying drawings. However, the present invention is not limited thereto, and should be interpreted to encompass various modifications that may be easily derived by those skilled in the art. The claims are intended to cover these modifications.

What is claimed is:

1. A power converter comprising:
    an energy storage element;
    a low-voltage side power switch having one end connected to a common node VX and configured to switch charging of the energy storage element with input power;
    a high-voltage side power switch having one end connected to the common node and configured to switch discharging of power stored in the energy storage element to a load;
    a switching controller configured to generate and output switching control signals for controlling on and off states of the high-voltage side power switch and the low-voltage side power switch; and
    a zero current detection circuit configured to compare outputs of the common node VX and a reference node VR, detect a zero current moment, and output a detection signal to the switching controller,
    wherein the power converter further comprises an offset calibrator configured to detect an error between an output time point of the zero current detection circuit and a falling time of common node output and to output a corresponding calibration signal to the zero current detection circuit.

2. The power converter according to claim 1, wherein the offset calibrator comprises a phase detector configured to receive an output signal of the zero current detection circuit and a falling time signal of the common node output to detect an error.

3. The power converter according to claim 1, wherein the offset calibrator comprises:
   a falling time detector configured to detect the falling time of the common node output;
   a phase detector configured to detect an error between output of the zero current detection circuit and output of the falling time detector; and
   an offset signal generator configured to output an offset control signal proportional to the detected error.

4. The power converter according to claim 3, wherein the zero current detection circuit comprises:
   a pre-amplifier configured to differentially amplify voltages of the common node and the reference node and adjust a differential voltage according to the offset control signal; and
   a phase comparator configured to receive the differential voltage and detect a zero current point.

5. The power converter according to claim 3, wherein the offset signal generator comprises:
   a duration detector configured to detect duration of a phase difference signal output by the phase detector; and
   a counter configured to output an offset control signal increasing in the duration detected by the duration detector.

6. The power converter according to claim 5, wherein the zero current detection circuit comprises:
   a pre-amplifier configured to differentially amplify voltages of the common node and the reference node and adjust a differential voltage according to the offset control signal; and
   a phase comparator configured to receive the differential voltage and detect a zero current point.

7. The power converter according to claim 6, wherein the pre-amplifier comprises:
   a first differential amplifier configured to differentially amplify the voltages of the common node and the reference node and output a positive differential voltage;
   a second differential amplifier configured to differentially amplify the voltages of the common node and the reference node and output a negative differential voltage; and
   a common current adjuster configured to adjust a common current of any one of the first or second differential amplifier according to the offset control signal.

8. The power converter according to claim 7, wherein the common current adjuster comprises an array resistor connected between any one common terminal of the first or second differential amplifier and a power terminal, connection of each corresponding resistor being switched by each bit of counter output.

9. The power converter according to claim 3, wherein the zero current detection circuit comprises:
   a comparison circuit including a plurality of dynamic comparators each including a pre-amplifier configured to differentially amplify voltages of the common node and the reference node and adjust a differential voltage according to the offset control signal and a phase comparator configured to receive the adjusted differential voltage and detect a zero current point;
   a clock generator including a plurality of flip-flops each configured to receive output of a dynamic comparator at a front stage as a clock signal and output the output as clock input of a dynamic comparator at a rear stage, thereby being included in a clock loop as a whole; and
   an output generator configured to logically sum outputs of the plurality of dynamic comparators and output the sum.

10. The power converter according to claim 9, wherein each phase comparator comprises a dynamic latch configured to synchronize with an input clock and output a pulse at a moment when output of the pre-amplifier becomes 0.

11. The power converter according to claim 10, wherein, in the clock generator, output of a front flip-flop is connected to reset input of each flip-flop in the clock loop.

12. The power converter according to claim 1, wherein the power converter is a boost type power converter, and the reference node is an output node.

13. A method of controlling power conversion of a power converter comprising an energy storage element, a low-voltage side power switch having one end connected to a common node VX and configured to switch charging of the energy storage element with input power, a high-voltage side power switch having one end connected to the common node and configured to switch discharging of power stored in the energy storage element to a load, a switching controller configured to generate and output switching control signals for controlling on and off states of the high-voltage side power switch and the low-voltage side power switch, and a zero current detection circuit configured to compare outputs of the common node VX and a reference node VR, detect a zero current moment, and output a detection signal to the switching controller, the method comprising:
   detecting an error between an output time point of the zero current detection circuit and a falling time of common node output and outputting a corresponding calibration signal to the zero current detection circuit.

14. The method according to claim 13, wherein the detecting and outputting comprises:
   detecting the falling time of the common node output;
   detecting an error between output of the zero current detection circuit and the detected falling time; and
   generating an offset control signal proportional to the detected error and outputting the offset control signal to the zero current detection circuit.

15. The method according to claim 14, wherein the generating and outputting an offset control signal comprises:
   detecting 41 the error detected in the detecting an error; and
   counting the duration detected in the detecting duration and outputting a counted value as the offset control signal.

16. The method according to claim 15, further comprising:
   differentially amplifying, by the zero current detection circuit, voltages of the common node and the reference node and adjusting a differential voltage according to the offset control signal; and
   receiving, by the zero current detection circuit, the differential voltage and detecting a zero current point.

* * * * *